(12) United States Patent
Hirman

(10) Patent No.: US 11,014,753 B1
(45) Date of Patent: May 25, 2021

(54) TRAJECTORY CONTROL OF DISCHARGE CONVEYOR

(71) Applicant: Caterpillar Paving Products Inc., Brooklyn Park, MN (US)

(72) Inventor: Colton J. Hirman, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 16/677,397

(22) Filed: Nov. 7, 2019

(51) Int. Cl.
*B65G 21/14* (2006.01)
*B65G 41/00* (2006.01)
*B65G 15/24* (2006.01)
*B65G 37/00* (2006.01)
*B65G 23/44* (2006.01)

(52) U.S. Cl.
CPC .......... *B65G 21/14* (2013.01); *B65G 15/24* (2013.01); *B65G 23/44* (2013.01); *B65G 37/00* (2013.01); *B65G 41/002* (2013.01); *B65G 2201/04* (2013.01); *B65G 2203/0283* (2013.01); *B65G 2814/0326* (2013.01)

(58) Field of Classification Search
CPC ........ B65G 21/10; B65G 21/14; B65G 15/24; B65G 23/44; B65G 37/00; B65G 41/002; B65G 41/008; E21C 35/20; E01C 23/088; E01C 23/127
USPC .......................................... 198/581
See application file for complete search history.

(56) References Cited

U.S. PATENT DOCUMENTS

| | | | |
|---|---|---|---|
| 3,085,675 A * | 4/1963 | Feiteira, Jr. | A01D 87/02 198/632 |
| 6,708,814 B2 | 3/2004 | Wagstaffe | |
| 7,347,311 B2 * | 3/2008 | Rudge | B65G 21/14 198/313 |
| 7,472,785 B2 | 1/2009 | Albright et al. | |
| 9,327,906 B2 | 5/2016 | Beaujot et al. | |
| 9,719,218 B2 | 8/2017 | Lee et al. | |
| 9,878,850 B2 | 1/2018 | Husar et al. | |
| 10,308,440 B2 | 6/2019 | Marsolek et al. | |
| 10,370,193 B2 | 8/2019 | Hirman | |
| 2007/0267273 A1 * | 11/2007 | Walsh | B65G 21/14 198/632 |
| 2014/0183003 A1 * | 7/2014 | Jorgensen | B65G 41/002 198/602 |
| 2015/0176230 A1 * | 6/2015 | Berning | E01C 23/127 299/18 |
| 2015/0218762 A1 | 8/2015 | Berning et al. | |
| 2016/0137422 A1 * | 5/2016 | Husar | E21C 35/20 299/39.2 |
| 2017/0044729 A1 * | 2/2017 | Lee | E01C 23/088 |

FOREIGN PATENT DOCUMENTS

| | | |
|---|---|---|
| CN | 104986510 B2 | 3/2004 |
| CN | 201546161 U | 8/2010 |

* cited by examiner

*Primary Examiner* — James R Bidwell
(74) *Attorney, Agent, or Firm* — von Briesen & Roper, s.c.

(57) ABSTRACT

In accordance with one aspect of the present disclose, a conveyor system for a cold planer is provided. The convey system may have a first conveyor, a second conveyor, a folding mechanism, and a belt tensioner. The second conveyor may have a first and a second conveyor sections, and the second conveyor section is vertically movable relative to the first conveyor section by the folding mechanism from a folded to an unfolded position, and while in the unfolded position.

20 Claims, 7 Drawing Sheets

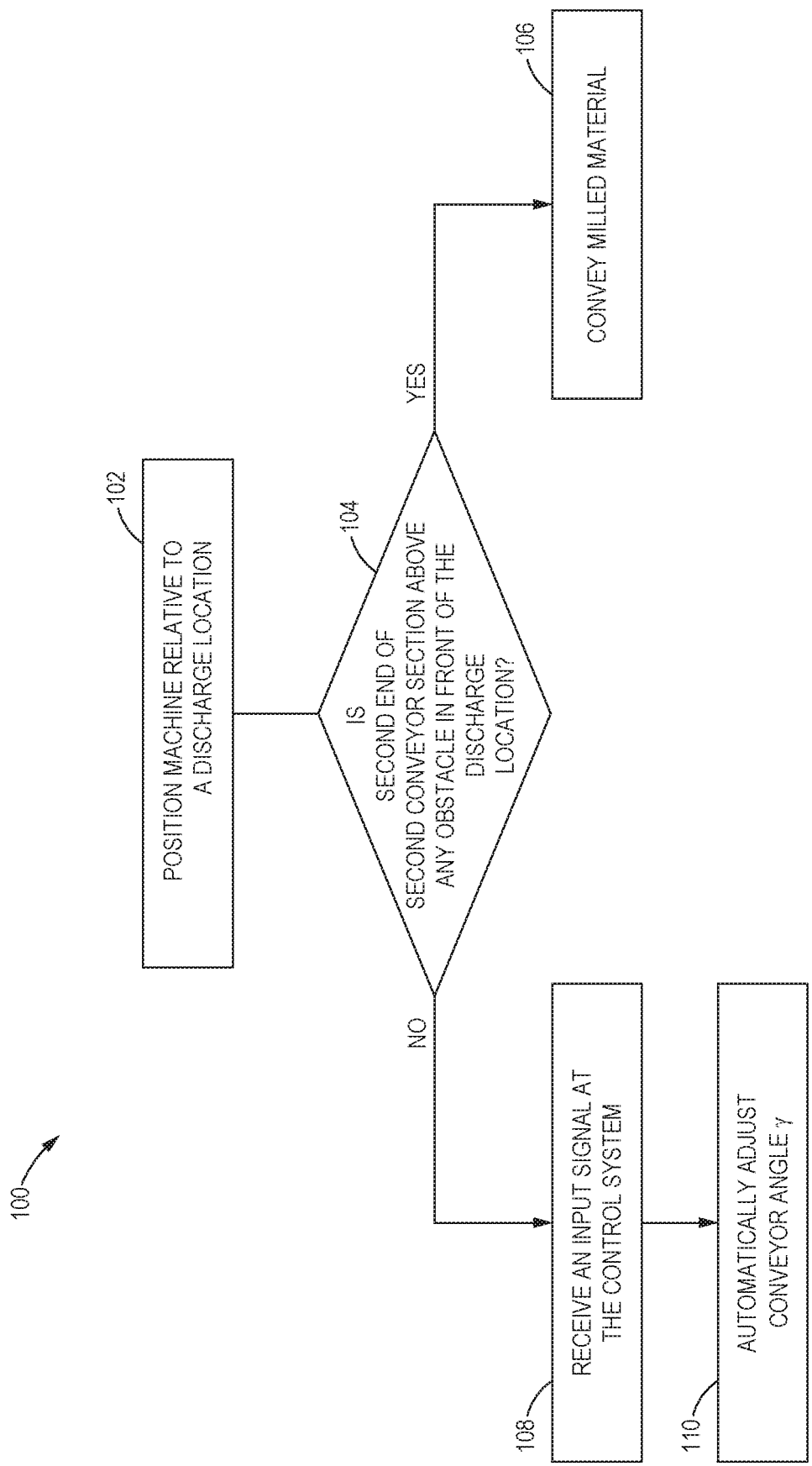

TRAJECTORY CONTROL OF DISCHARGE CONVEYOR

TECHNICAL FIELD

The present disclosure generally relates to cold planer machines and, more particularly, relates to conveyors associated with cold planer machines.

BACKGROUND

Cold planer machines are a type of road construction vehicle and generally include a machine frame and a cutting drum rotatably mounted on the machine frame. The cutting drum facilitates removing material from a roadbed, such as asphalt. The machine also includes a conveyor used for transporting the asphalt to a discharge location such as a truck bed of a dump truck. They conveyor typically has a first section connected to the main frame and a second section that is pivotally connected to the first section, and the conveyor is adapted to be folded for transportation of the cold planer between job sites. The conveyor is folded by pivotally moving the second section with respect to the first section, such that, the second section is folded from U.S. Patent Publication No. 2015/0218762, entitled "Automotive Milling Machine, and a Method for Unloading Milled Material" discloses an automotive milling machine. The automotive milling machine of the '762 patent application publication includes a transport conveyor pivotable relative to a machine frame and a controller that has a detection and control system. Furthermore, the control system is used to continuously locate an alterable position of a transport vehicle and continuously control position on the point of impingement of the milled material onto the transport vehicle.

However, there is still a need for an effective way to adjust the tensioning system of a conveyor to accommodate for a hinge movement and automatically adjusting a conveying angle.

SUMMARY

In one aspect, the present disclosure relates to a conveyor system for a cold planer that has a first conveyor and a second conveyor. The second conveyor can convey a milled material from the first conveyor to a discharge location, and is made of a first and a second conveyor sections and a conveyor belt that rotates around both sections. A folding mechanism has a pivoted connection between the first and second conveyor sections and may be used to provide vertical movement to rotate the second conveyor section around an axis of the pivoted connection from a folded position to an unfolded position, and to provide vertical movement of the second conveyor section in the unfolded position during an operating state of the cold planer. Further, the conveyor system may have a belt tensioner that may provide a constant load to the conveyor belt when the second conveyor section is moved stationary or moved relative to the first conveyor section.

In another aspect, the present disclosure relates to a method of adjusting the position of a cold planer discharge conveyor. The method may include providing a conveyor system that has a frame, a first conveyor that may convey a milled material away from a milling drum, a second conveyor that has a first and a second conveyor section and may convey a milled material from the first conveyor to a discharge location, a conveyor belt that rotates around the first and second conveyor sections, a folding mechanism that has a pivoted connection between the first and second conveyor sections and may provide vertical movement to rotate the second conveyor section around an axis of the pivoted connection from a folded position to an unfolded position, and a belt tension that may provide a constant load to the conveyor belt when the second conveyor section is stationary or moved relative to the first conveyor section. The method may further include receiving a signal at a control system from an operator control, the conveyor system automatically adjust a conveying angle between the first conveyor section and the second conveyor section by directing the folding mechanism to vertically move the second conveyor section around the axis of the pivoted connection in the unfolded position during an operating state of the cold planer.

Further, one aspect of the present disclosure may include a cold planer that has a milling drum, a frame, a first conveyor that may convey a milled material away from a milling drum, a second conveyor that has a first and a second conveyor section and may convey a milled material from the first conveyor to a discharge location, a conveyor belt that rotates around the first and second conveyor sections, a folding mechanism that has a pivoted connection between the first and second conveyor sections and may provide vertical movement to rotate the second conveyor section around an axis of the pivoted connection from a folded position to an unfolded position, and a belt tension that may provide a constant load to the conveyor belt when the second conveyor section is stationary or moved relative to the first conveyor section. The cold planer may further have a control that may receive a signal and use the folding mechanism to vertically move and adjust the second conveyor section around the axis of the pivoted connection in the unfolded position during an operating state of the cold planer.

These and other aspects and features of the present disclosure will be more readily understood when read in conjunction with the accompanying drawings.

BRIEF DESCRIPTION OF THE DRAWINGS

FIG. 7 is a flowchart illustrating an example process for controlling the trajectory of a second conveyor of a cold planer.

While the present disclosure is susceptible to various modifications and alternative constructions, certain illustrative embodiments thereof will be shown and described in detail. The disclosure is not limited to the specific embodiments disclosed, but instead includes all modification, alternative constructions, and equivalents thereof.

DETAILED DESCRIPTION

Figure 1:
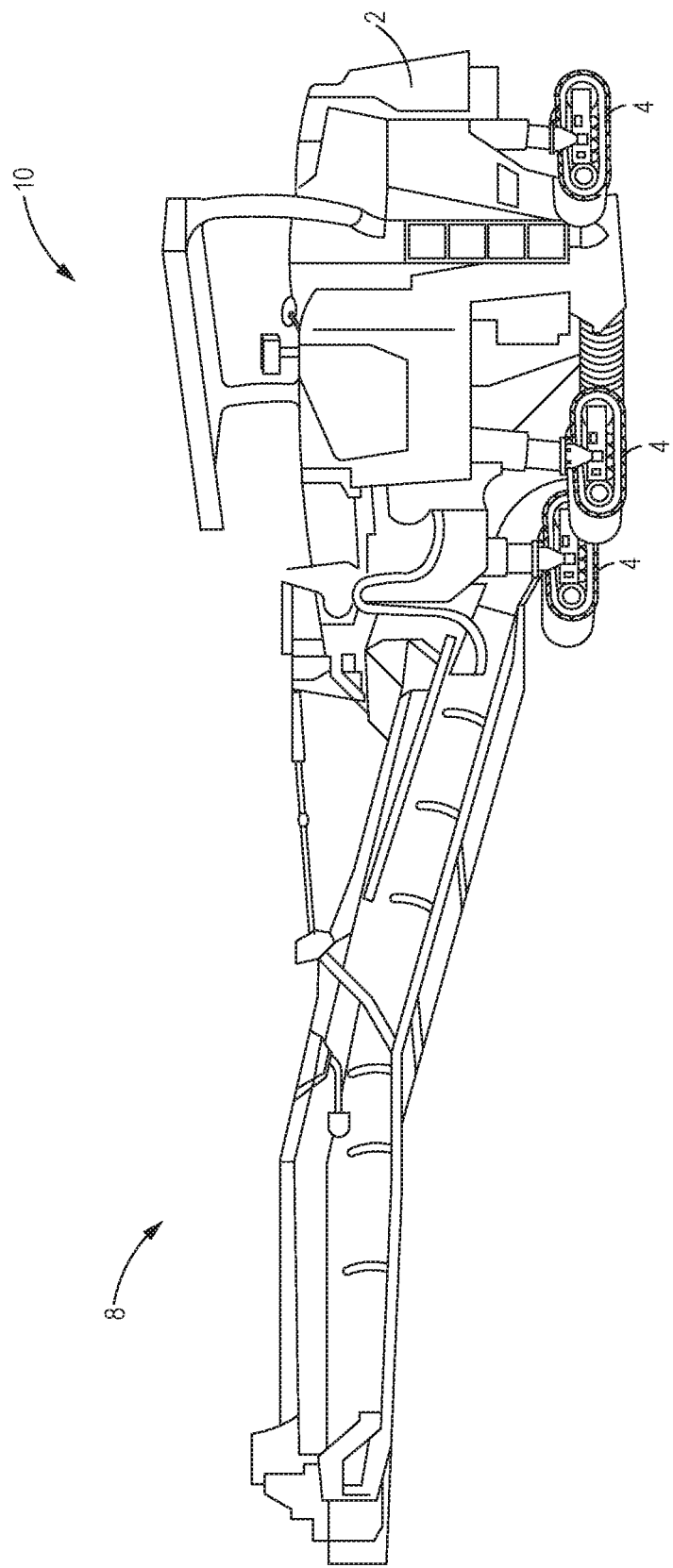
FIG. 1 is a perspective view of a machine, in accordance with one embodiment of the present disclosure.
Figure 2:
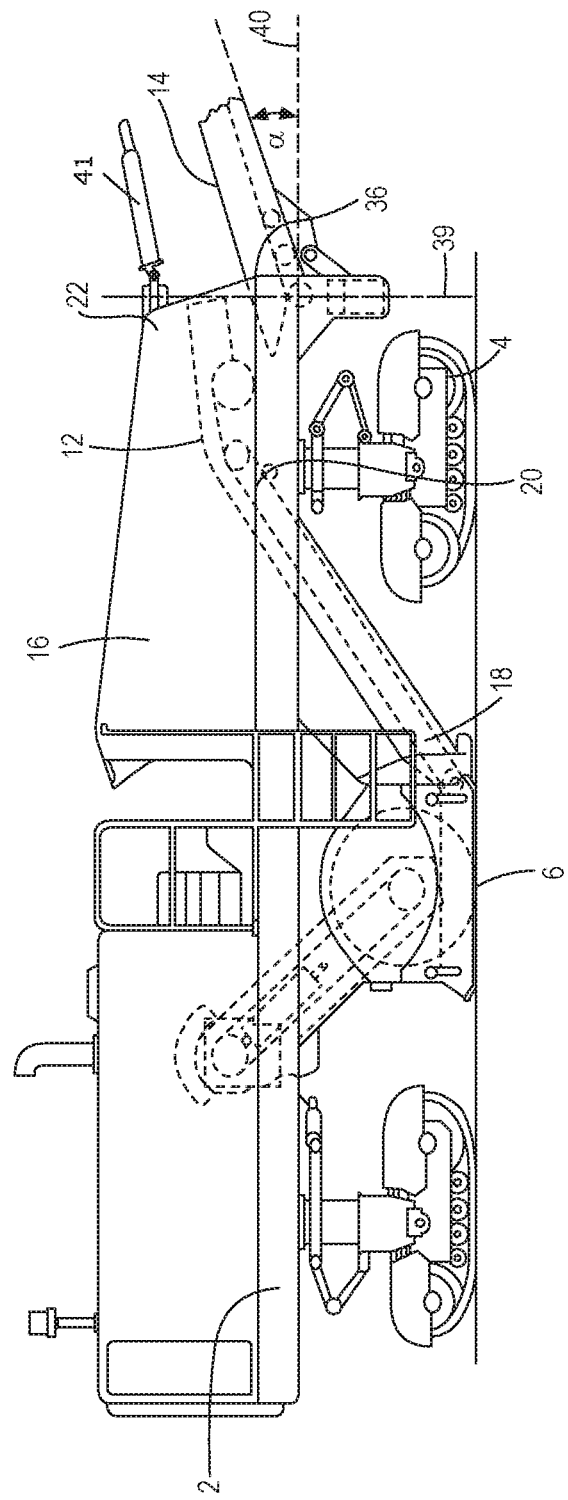
FIG. 2 is a diagrammatic side view of a conveyor system for the machine of FIG. 1.

Referring now to the drawings, and with specific reference to FIG. 1, a machine consistent with certain embodiments of the present disclosure is generally referred to by reference numeral 1. Although the machine 1 is illustrated as a cold planer, the machine 1 is shown primarily for illustrative purposes to assist in disclosing features of various embodiments, in that FIG. 1 does not depict all of the components of a machine. Moreover, the readings of this disclosure can be employed on other earth moving and construction machines as well.

The machine 1 may comprise a frame 2 supported by traction devices 4. Although traction devices 4 are shown as tracks, traction devices 4 may be wheels or of any other type. Mounted on the frame 2 may be a milling drum 6 and the conveyor system 8. As an example, the milling drum 6 may be configured to mill a road surface, while the conveyor system 8 may be configured to transfer the milled material from the milling drum 6 to a discharge location (reference number 38 as discussed below), such as, a bed of a dump truck (not shown).

Referring to FIGS. 2-5, with continued reference to FIG. 1, the conveyor system 8 may comprise a first conveyor 12 and second conveyor 14. The first conveyor 12 may be configured to convey the milled material away from the milling drum 6 to the second conveyor 14, while the second conveyor 14 may be configured to convey the milled material from the first conveyor 12 to the discharge location.

Figure 3:
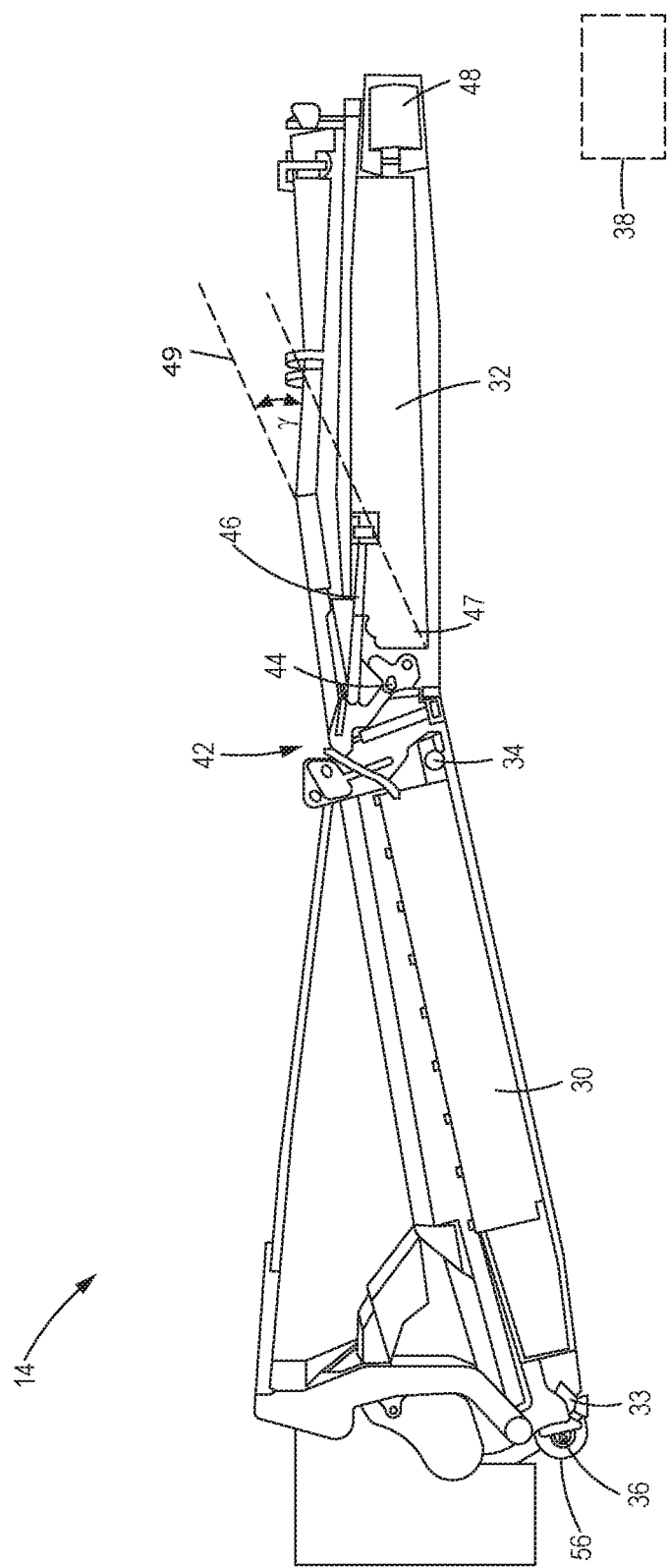
FIG. 3 is a diagrammatic side view of a second conveyor for the conveyor system of FIG. 2.

In one example, the first conveyor 12 may be connected within to the frame 2 and positioned within a frame housing 16, extending from a first end 18 to a second end 20. More specifically, the first end 18 of the first conveyor 12 may be proximate the milling drum 6, and the second end 20 of the first conveyor 12 may be proximate an end 22 of the frame 2. As best shown in FIG. 3, the second conveyor 14 has a first conveyor section 30 and a second conveyor section 32. Extending from a first end 33 to a second end 34 of the first conveyor section 30, the second conveyor 14 may be pivotally connected relative to the second end 20 of the first conveyor 12. For instance, the conveyor system 8 may include a first pivoted connection 36 between the first end 33 of the second conveyor 14 and the end 22 of the frame 2.

The first pivoted connection 36 between the second conveyor 12 and the frame 2 may provide the conveyor system 8 a first range of motion for positioning of the second conveyor 14 while the machine 1 is in an operating state. In so doing, the milled material may be conveyed to the discharge location 38 without having to align the machine 1 with the discharge location 38. This may be particularly beneficial in accommodating dump trucks of different heights. As used herein, the term "operating state" may refer to a condition of the machine 1 when the machine is performing work operations, such as, milling.

More specifically, the first pivoted connection 36 may provide vertical movement of the second conveyor 14 relative to the first conveyor 12, as well as lateral movement of the second conveyor 14 relative to the first conveyor 12 about a vertical axis 39. Vertical movement of the first pivoted connection 36 may provide an inclination angle $\alpha$ between a horizontal axis 40 and the second conveyor 14. Lateral movement of the first pivoted connection 36 may provide a side-to-side or rotation angle $\beta$ about the vertical axis 39. In one example, the inclination angle $\alpha$ may be between an inclusive range of zero degrees to ninety degrees, and the rotation angle $\beta$ may be between an inclusive range of negative 30 degrees to thirty degrees. However, other numerical ranges for the inclination angle $\alpha$ and the rotation angle $\beta$ may be used. In another example, a hydraulic cylinder 41 that attaches to both the frame 2 and the second conveyor 14 may be used to adjust height inclination angle $\alpha$ or the rotation angle $\beta$.

Furthermore, the conveyor system 8 may include a folding mechanism 42 within the second conveyor 14 in order to provide the conveyor system 8 a second range of motion for positioning of the second conveyor 14 while the machine 1 is in the operating state. The folding mechanism 42 includes a second pivoted connection 44 and a hydraulic system 46. The second pivoted connection 44 may be disposed between the first conveyor section 30 and the second conveyor section 32. More specifically, the first conveyor section 30 may extend from the first end 33 to the second end 34, and the second conveyor section 32 may extend from a first end 47 to a second end 48.

The second pivoted connection 44 may pivotally connect the second end 34 of the first conveyor section 30 to the first end 47 of the second conveyor section 32. Moreover, the folding mechanism 42 may provide vertical movement to rotate the second conveyor section 32 around an axis (not shown) of the second pivoted connection 44. Thus, the second pivoted connection 44 of the folding mechanism 42 provides controlled articulation, vertical movement, and positioning of the second conveyor section 14 relative to the first conveyor section 12 during operating state of the machine 1. In so doing, precise angling of the milled material into the discharge location 38, or conveyor height, during an operating state of the machine 1, may be achieved, such as, when maneuvering the second conveyor 14 to a tall dump truck.

Figure 5:
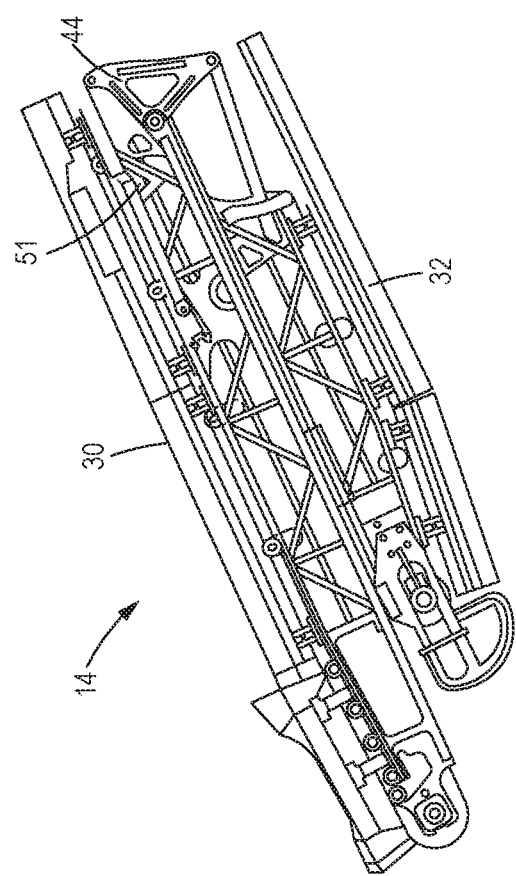
FIG. 5 is a side view of the second conveyor of FIG. 4 in a folded position according to aspects of the present disclosure.

In one example, the folding mechanism 42 is configured to provide vertical movement to rotate the second conveyor section 32 around an axis (not shown) of the pivoted connection from a folded position (the second conveyor 14 as shown in FIG. 5) to an unfolded position (the second conveyor 14 as shown in FIG. 3). The unfolded position is when the second conveyor section 32 is extended outwards away from the machine 1, best shown in FIG. 3, as to allow the conveyor system 8 to convey a milled material to the discharge location 38. In moving from the folded position to the unfolded position, the folding mechanism 42 may provide vertical movement of the second conveyor section 32 relative to the first conveyor section 30, and this vertical movement may provide a conveying angle $\gamma$ between the second conveyor section 32 and an axis 49 parallel to the longitudinal top surface of the first conveyor section 30. Once moved to the unfolded position, the second conveyor section 32 defaults to a home position in which the conveying angle $\gamma$ is about 8-15 degrees.

The folding mechanism 42 is capable of moving the second conveyor from the folded position, as shown in FIG. 5, and the unfolded position, as shown in FIG. 3, and vice versa. The folded position is beneficial for transport of the machine 1 to allow the second conveyor 14 to be more compact. The conveyor 14 includes the hydraulic system 46 that includes one or more hydraulic cylinders 51 operably coupled to the first conveyor section 30 and the second conveyor section 32. The hydraulic system 46 may be used to vertically move the second conveyor section 32 rotatably around the second pivoted connection 36 when moving the second conveyor 14 from the folded position to the unfolded position. The hydraulic system 46 may also include one or more pumps, valves, cylinders, accessories, and the like. For example, the second pivoted connection 36 may include hydraulic cylinders 51, on each side of the second conveyor 14. However, other mechanisms and configurations may be used.

Figure 4:
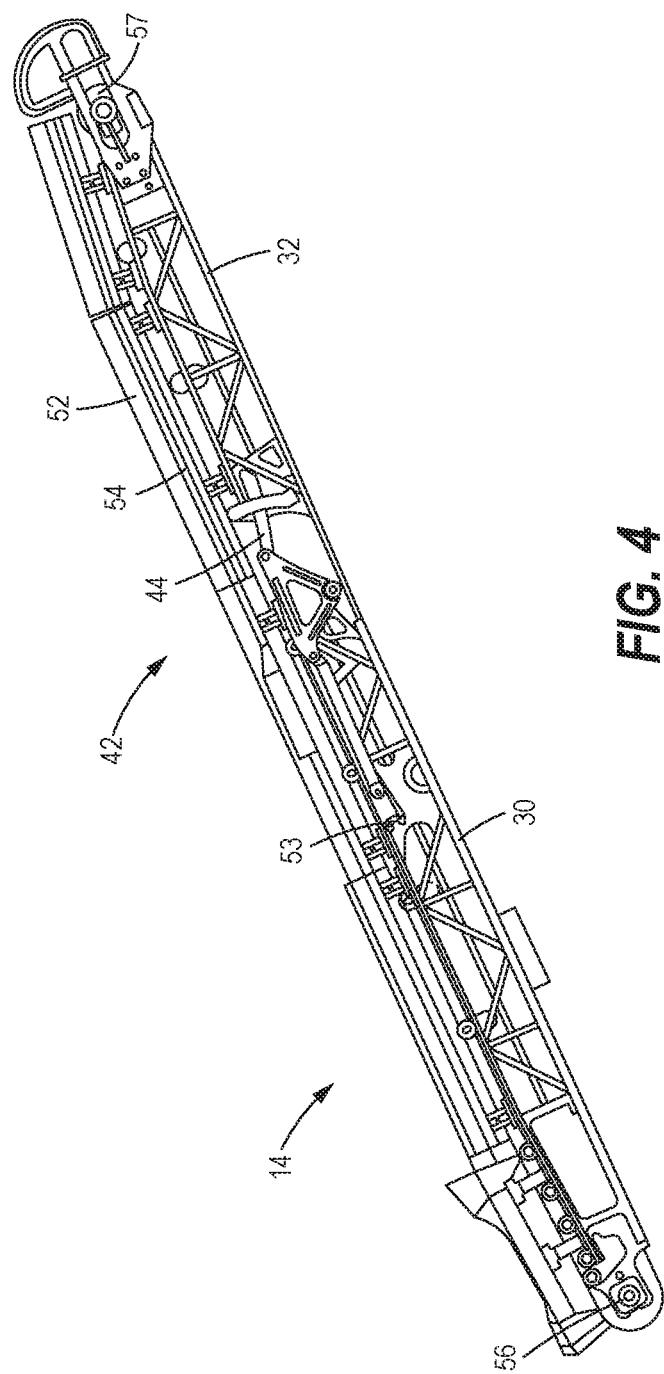
FIG. 4 is a side view of a second conveyor, in accordance with another embodiment.

After the second conveyor 14 is in the unfolded position, shown in FIG. 3, the folding mechanism 42 may be used to provide vertical movement to the second conveyor section 32 around the axis (not shown) of the second pivoted connection 44 during an operating state of the machine 1. As best shown in FIG. 4, the vertical movement of the second conveyor section 32 in the unfolded position using the folding mechanism 42 allows the conveyor system 8 to raise the second conveyor section 32 from the home position, having a conveying angle γ of around 8-15 degrees, up to a conveying angle γ of 0 degrees, in which the second conveyor section 32 is longitudinal parallel to the first conveyor section. In this example, the second conveyor can be raised to better convey the milled material into a truck bed of taller dump truck having (not shown) the discharge location 38 in its truck bed (not shown) that may be unreachable without this movement. Further, the folding mechanism 42 may increase the conveying angle γ by lowering the second conveyor section 32 relative to the first conveyor section 30. In one example, the conveying angle γ may be increased from around 8-15 degrees in the home position to 90 degrees, but in other examples this value can be different depending on the operational requirements of the machine 1.

The second conveyor 14 may further include a conveyor belt 52 adapted to rotate around both of the first conveyor section 12 and second conveyor section 14. More specifically, the conveyor belt 52 may rotate around support structures 53, 54 of the first conveyor section 30 and the second conveyor section 32, respectively, in a continuous loop. The conveyor belt 51 may include one or more belt tensioners, such as first belt tensioner 56 configured to provide a constant load to the conveyor belt 51 when the second conveyor section 32 is stationary, or moved, relative to the first conveyor section 30.

The second conveyor section 32 may include a second belt tensioner 57 for the conveyor belt 51 in addition to for the first belt tensioner 56. The second belt tensioner 57 may be configured to apply an additional load to the conveyor belt 51 to maintain a tension when the second conveyor section 32 is moved relative to the first conveyor section 30. For instance, after vertical movement of the second conveyor section 32 due to the folding mechanism 42, the second belt tensioner 57 may adjust the tension of the conveyor belt 51.

Figure 6:
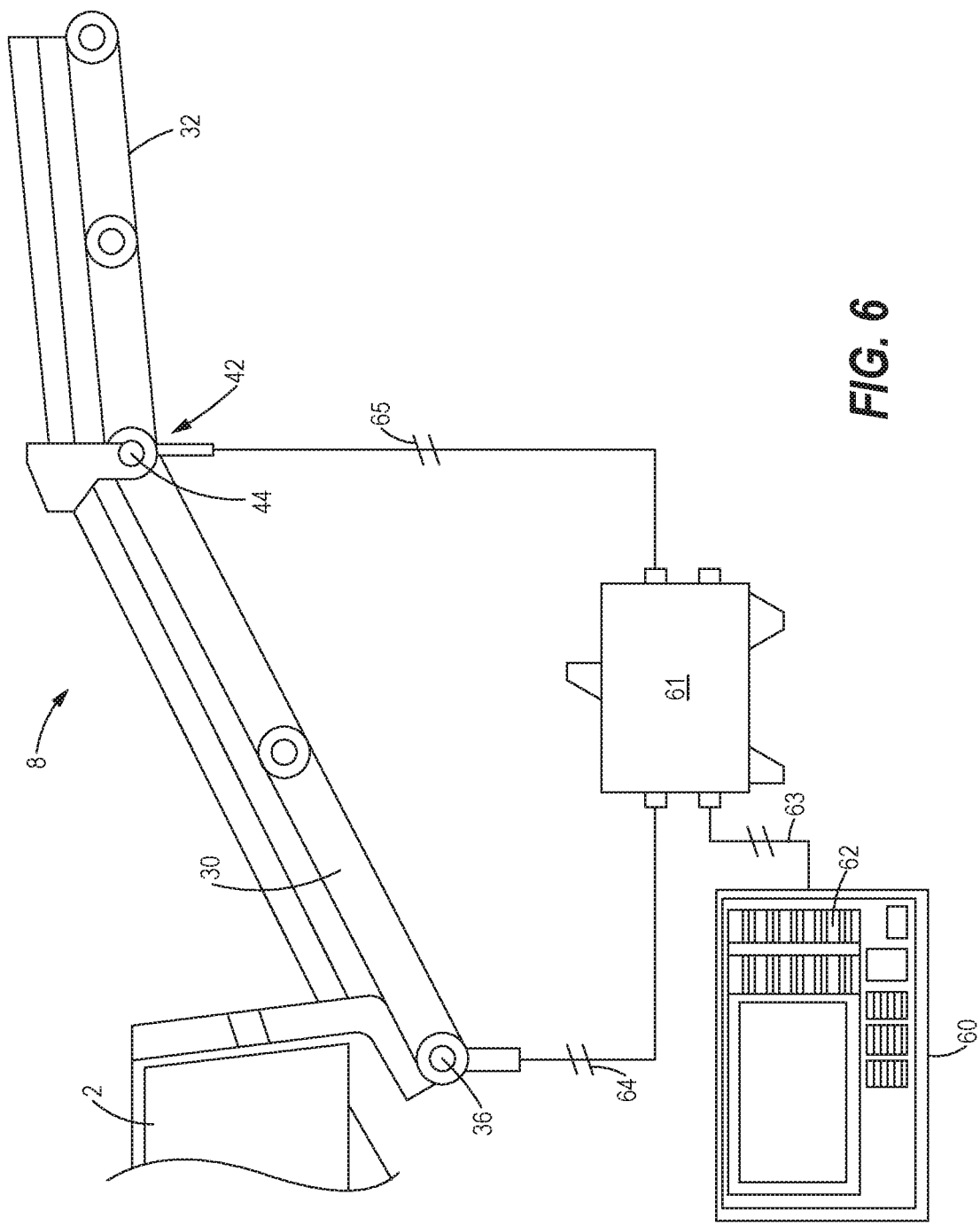
FIG. 6 is diagrammatic illustration of an exemplary conveyor system according to aspects of the present disclosure.

As illustrated in FIG. 6, the conveyor system 8 may be associated with the machine 1 and include elements to monitor, analyze, and control the conveying of the milled material to the discharge location 38. The conveyor system 8 may include an operator control 60 in communication with a control system 61, configured to receive an input 62 and send an electronic signal 63 associated with that input 62 to the control system 61. The operator control 60 may be a joystick or any other type. The control system 61, after receiving the electronic signal 63 associated with the input 62 from the operator control 60, sends a second electronic signal 64 or a third electronic signal 65 to the first pivoted connection 36 and the second pivoted connection 44, respectively. The first pivoted connection 36 vertically moves the first conveyor section 30 relative to the frame, and the second pivoted connection 44 uses the folding mechanism 42 to vertically move the second conveyor section 32 relative to the first conveyor section 30. In one example, the control system 61 analyzes the first electronic signal 61, processes it, and automatically and continuously moves the second conveyor section 32 relative to the first conveyor section 30, and may also move the first conveyor section 30 relative to the frame 2, directed by the electronic signal 61 based on the input 62. In this example, the input 62 can be a desired discharge location 38, or the desired vertical positioning of the of the second conveyor section 32 relative to the first conveyor section 30, or the desired vertical positioning of the conveyor height. Further, in this example, the control system automatically and continuously adjusts the conveying angle γ through vertical movement of the second conveying section 32 relative to the first conveying section 30, as well as continuously adjusting the inclination angle α through vertical movement of the first conveyor section 30 relative to the frame 2 based on the input 63. During operation, the second conveyor 14 may continue to receive the milled material from the first conveyor 12 during the adjusting of the second conveyor section 32 in the unfolded position.

The operator control 60 may provide the necessary controls and machine boundary conditions that can be operated during the operating state of the machine 1. The machine boundary conditions may be the conditions or limitations the machine 1 may be operated in, and can include the maximum and minimum conveying angle γ when the second conveyor 14 is in the unfolded position, or in the folded position.

In another example, the control system 61 may further be coupled to the first or second belt tensioner 56, 57, or any other belt tensioning devices. In this example, the control system 61 may receive a signal (not shown) from a monitoring device (not shown) that monitors the tension in the conveyor belt 52. In one example, the first and second belt tensioner 56, 57, may function as the monitoring device. Further, once receiving the signal from the monitoring device, the control device may send a second signal (not shown) to the first or second belt tensioner 56, 57, to adjust the tension in the conveyor belt 52 by increasing or decreasing the applied load. Further, the control system 61 may send this signal based on a vertical movement of the first or second conveyor sections 30, 62.

The control system 61 may embody a single microprocessor or multiple microprocessors that include a means for monitoring operator and sensor input, and responsively adjusting operational characteristics of machine 1 based on the input 62. For example, control system 61 may include a memory, a secondary storage device, a clock, and a processor, such as a central processing unit or any other means for accomplishing a task consistent with the present disclosure. Numerous commercially available microprocessors can be configured to perform the functions of control system 61. It should be appreciated that control system 61 could readily embody a general machine controller capable of controlling numerous other machine functions. Various other known circuits may be associated with control system 61, including signal-conditioning circuitry, communication circuitry, and other appropriate circuitry. Control system 61 may be further communicatively coupled with an external computer system, instead of or in addition to including a computer system, as desired.

INDUSTRIAL APPLICABILITY

In general, the foregoing disclosure finds utility in various applications, such as, in earthmoving, construction, industrial, agricultural, mining, transportation, and forestry machines. In particular, the disclosed convey system may be used by cold planer machines and other applications, such as, a quarry conveyor and the like. By applying the disclosed conveyor system to a cold planer machine, optimum placement of the discharge conveyor may be achieved.

In particular, the disclosed conveyor system provides a second pivoted connection or articulation joint to the secondary conveyor that is driven by a folding mechanism. Furthermore, the control system associated with the conveyor system allows the operator of the machine to enter or select an input within the machine boundary conditions that can be operated while automatically varying the angle between a first and second conveyor section of the second conveyor. In so doing, the second conveyor may be positioned automatically based on a signal from the control system.

Turning now to FIG. 7, with continued references to FIGS. 1-6, a flowchart illustrating an example process 100 for positioning a second conveyor 14 of a machine 1 in order to convey a milled material from a first conveyor 12 to a discharge location 38 by automatically varying the conveying angle γ is disclosed. At block 102, the machine 1 may be positioned relative to the discharge location 38. At block 104, it is determined whether the second end 48 of the second conveyor section 32 above any obstacle in front of the discharge location 38. For example, the discharge location 38 may be the best of a dump truck (not shown), and the obstacle could be the walls surrounding the bed of the dump truck.

If, at block 104, the second end 48 of the second conveyor section 32 is above any obstacle in front of the discharge location 38, the process 100 proceeds to block 106. At block 106, the machine 1 may continue to convey milled material. If, at block 104, the second end of the second conveyor is not above an obstacle of obstacle in front of the discharge location, process 100 proceeds to block 108. At block 108, an operator of the machine 1 would enter an input 62 on the operator control 60, within machine boundary conditions, and the operator control 60 would send a signal 63 to the control system 61. The machine would then automatically adjust the conveying angle γ at block 110, and may also automatically adjust the inclination angle α and for any tension in the conveyor belt 52.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A conveyor system for a cold planer, comprising:
    a first conveyor,
    a second conveyor configured to convey a milled material from the first conveyor to a discharge location, the second conveyor including a first conveyor section, a second conveyor section, and a conveyor belt adapted to rotate around the first conveyor section and the second conveyor section;
    a folding mechanism including a pivoted connection between the first conveyor section and the second conveyor section, the folding mechanism configured to provide vertical movement to rotate the second conveyor section around an axis of the pivoted connection from a folded position to an unfolded position, and provide vertical movement to the second conveyor section around the axis of the pivoted connection in the unfolded position during an operating state of the cold planer; and
    a control system configured to automatically adjust a conveying angle of the second conveyor section relative to the first conveyor section.

2. The conveyor system of claim 1, in which the control system is configured to receive a signal from an operator control and is further configured to provide automatic adjustment of the conveying angle through movement of the second conveyor section in the unfolded position in response to the signal.

3. The conveyor system of claim 2, in which in a home position, the second conveyor section has a conveyor angle that is between 8 to 15 degrees lower than the first conveyor section.

4. The conveyor system of claim 3, in which the folding mechanism is configured to vertically raise the second conveyor section from the home position to be parallel with the first conveyor section at a conveyor angle of 0.

5. The conveyor of claim 3, in which the folding mechanism is configured to increase the conveyor angle by lowering the second conveyor section relative to the first conveyor section.

6. The conveyor of claim 2, in which the first conveyor section is pivotally connected to the frame, and the control system automatically adjust the conveying angle of the second conveyor section relative to the first conveyor section and an inclination angle of the first conveyor section relative to the frame based on the signal.

7. The conveyor system of claim 1, further comprising a belt tensioner configured to provide a constant load to the conveyor belt when the second conveyor section is stationary or moved relative to the first conveyor section in the unfolded position, in which the control system monitors the tension in the conveyor belt and controls the belt tensioner to keep the constant load on the conveyor belt constant relative to a constant position of the first and second conveyor sections.

8. The conveyor system of claim 2, in which the signal is received from the operator control, and the control system processes the signal and automatically and continuously moves the second conveyor section relative to the first conveyor section.

9. The conveyor system of claim 8, in which the operator control provides the signal within a machine boundary condition.

10. The conveyor system of claim 1, in which a hydraulic system drives the folding mechanism to rotate the second conveyor section from the folded to the unfolded position.

11. The conveyor of claim 10, in which the hydraulic system further drives the folding mechanism to provide vertical movement to the second conveyor section around the axis of the pivoted connection in the unfolded position during the operating state of the cold planer.

12. A method of adjusting the position of a cold planer discharge conveyor, the method comprising:
   providing a conveyor system, the conveyor system including:
      a frame;
      a first conveyor operatively configured to convey a milled material away from a milling drum;
      a second conveyor configured to convey the milled material from the first conveyor to a discharge location, the second conveyor including a first conveyor section pivotally connected to the frame, a second conveyor section, and a conveyor belt adapted to rotate around the first conveyor section and the second conveyor section;
      a folding mechanism including a pivoted connection between the first conveyor section and the second conveyor section, the folding mechanism configured to provide vertical movement to rotate the second conveyor section around an axis of the pivoted connection from a folded position to an unfolded position; and
      a belt tensioner configured to provide a constant load to the conveyor belt when the second conveyor section is stationary or moved relative to the first conveyor section; and
   receiving a signal at a control system from an operator control, the control system automatically adjusting a conveying angle between the first conveyor section and the second conveyor section by directing the folding mechanism to provide vertical movement to the second conveyor section around the axis of the pivoted connection in the unfolded position, and the control system further automatically adjusting an inclination angle of the first conveyor section relative to the frame in response to the signal.

13. The method of claim 12, in which the signal is sent from an operator control when an input is entered into the operator control.

14. The method of claim 13, in which the signal is received at the folding mechanism.

15. The method of claim 12, in which in a home position, the second conveyor section has a conveyor angle that is between 8 to 15 degrees lower than the first conveyor section.

16. The method of claim 15, in which the second conveyor section moves to the home position after moving from the folded position to the unfolded position.

17. The method of claim 15, in which when the folding mechanism is configured to vertically raise the second conveyor section from the home position to be parallel with the first conveyor section at a conveyor angle of 0.

18. A cold planer, comprising:
   a milling drum;
   a frame;
   a first conveyor operatively configured to convey a milled material away from the milling drum; and
   a second conveyor including,
      a second conveyor configured to convey the milled material from the first conveyor to a discharge location, the second conveyor including a first conveyor section, a second conveyor section, and a conveyor belt adapted to rotate around the first conveyor section and the second conveyor section,
      a folding mechanism including a pivoted connection between the first conveyor section and the second conveyor section, the folding mechanism configured to provide vertical movement to rotate the second conveyor section around an axis of the pivoted connection from a folded position to an unfolded position,
      a belt tensioner configured to provide a constant load to the conveyor belt when the second conveyor section is stationary or moved relative to the first conveyor section, and
      a control configured to receive a signal and utilize the folding mechanism to provide vertical movement to adjust the second conveyor section around the axis of the pivoted connection in the unfolded position during an operating state of the cold planer, and the control system further configured to monitor the tension in the conveyor belt and control the belt tensioner to keep the constant load relative to a constant position of the first and second conveyor sections.

19. The cold planer of claim 18, in which the signal is sent from an operator control when an input is entered the operator control.

20. The cold planer of claim 18, in which the second conveyor is configured to receive the milled material from the first conveyor after the adjusting of the second conveyor section.

* * * * *